United States Patent [19]
Welsh et al.

[11] Patent Number: 4,458,023
[45] Date of Patent: Jul. 3, 1984

[54] CATALYST MANUFACTURE

[75] Inventors: William A. Welsh, Fulton; Mark A. Seese, Ellicot City; Alan W. Pelers, Rockville, all of Md.

[73] Assignee: W. R. Grace & Co., New York, N.Y.

[21] Appl. No.: 438,599

[22] Filed: Nov. 2, 1982

Related U.S. Application Data

[63] Continuation-in-part of Ser. No. 291,178, Aug. 10, 1981, abandoned.

[51] Int. Cl.³ ............................................. B01J 29/06
[52] U.S. Cl. ...................................... 502/65; 502/64; 502/68
[58] Field of Search ................ 252/455 Z; 502/64, 65, 502/68

[56] References Cited

U.S. PATENT DOCUMENTS 3,413,238 11/1968 Gladrow et al. ............... 252/455 Z
3,425,956 2/1969 Baker et al. .................... 252/455 Z

FOREIGN PATENT DOCUMENTS 967136 5/1975 Canada .

Primary Examiner—Carl F. Dees
Attorney, Agent, or Firm—Arthur P. Savage

[57] ABSTRACT

Zeolite containing catalysts and catalyst supports are prepared by forming and drying an aqueous slurry of zeolite, aluminum chlorhydrol and optimally clay to obtain particulate composites in which the zeolite component contains in excess of about 1 percent by weight alkali metal oxide. The particulate composites are calcined, and in some instances ion exchanged to obtain hard, attrition resistant catalytic particles.

28 Claims, 1 Drawing Figure

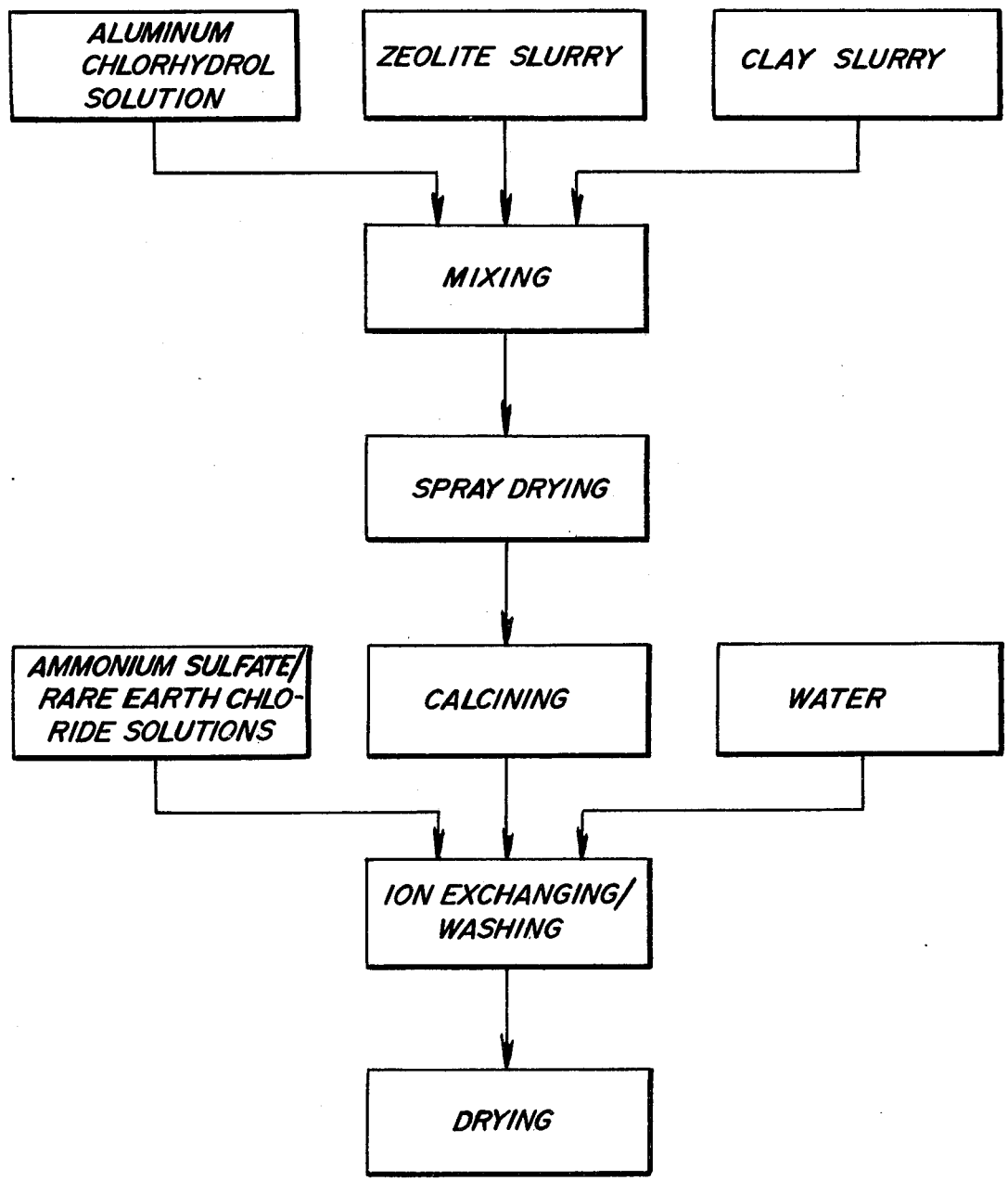

CATALYST MANUFACTURE

This application is a continuation-in-part of our application Ser. No. 291,178 filed Aug. 10, 1981 and now abandoned.

The present invention relates to the manufature of catalysts, and more specifically to the preparation of hard, attrition resistant zeolite containing catalysts which are highly active for the catalytic conversion of hydrocarbons.

Hydrocarbon conversion catalysts such as fluid cracking catalysts (FCC) which comprise crystalline zeolites dispersed in an inorganic oxide matrix are typically prepared by spray drying an aqueous slurry of zeolite, clay and a suitable binder such as silica-alumina hydrogel, silica sol or alumina sol. The spray dried catalyst particles may be calcined and ion exchanged to remove undesirable alkali metal impurities.

Canadian Pat. No. 967,136 describes hydrocabon conversion catalyst which comprises zeolite, clay and an alumina sol binder. The catalysts are prepared by spray drying a mixture of low soda ion exchanged zeolite, clay, and alumina sol (chlorhydrol), and calcining the spray dried particles to obtain hard, attrition resistant catalysts.

U.S. Pat. No. 3,425,956 describes a method for preparing a zeolite containing cracking catalyst wherein a spray dried composite of partially ion exchanged zeolite and silica-alumina hydrogel is calcined and subsequently ion exchanged. The calcination step stabilizes zeolite and enhances alkali metal oxide removal.

In recent years the cracking catalyst industry has been particularly concerned with regard to the production of catalysts which are highly attrition resistant, active and selective for the production of gasoline fractions.

It is therefore an object of the present invention to provide a process by which highly active, attrition resistant catalysts and catalyst supports may be economically prepared.

It is another object to provide a zeolitic hydrocarbon conversion catalyst preparation method wherein the need for multiple high temperature calcination steps may be eliminated.

It is yet another object to produce thermally stable catalytic cracking catalysts which are capable of producing a high level of gasoline fractions.

It is still a further object to provide zeolite containing fluid cracking catalysts which are selective for the preparation of high octane gasoline fractions.

These and other objects of the present invention will become readily apparent to one skilled in the art following the detailed description and drawing wherein the FIGURE comprises a block flow diagram which outlines a process which incorporates the teaching of our invention.

Broadly, our invention contemplates methods for preparing alumina bound zeolite containing catalyst composites wherein a zeolite component which contains more than 1 percent by weight alkali metal oxide (typically $Na_2O$) is combined with aqueous aluminum chlorhydrol solution, and, in some instances, particulate components such as clay and/or alumina, formed into particulate composites, calcined, and, when required, ion-exchanged and/or washed to remove excess alkali metal ions.

More specifically we have found that valuable zeolite containing catalysts and catalyst supports may be obtained by the process which is outlined as follows:

(1) An alkali metal containing zeolite which contains more than 1 percent by weight alkali metal oxide is mixed with aluminum chlorhydrol, water, and, if desired, a particulate component such as clay and/or alumina to obtain a mixture that is plastic or fluid in consistency.

(2) The mixture is then formed into particles of desired shape and size and dried to obtain solid particulate zeolite-chlorhydrol containing composites.

(3) The particulate composites are then calcined to convert the aluminum chlorhydrol component into a strong alumina binder and impart physical strength to the particles and in some instances "activate" the alkali metal ions for removal by ion exchange and/or washing.

(4) The calcined composites, particularly those which contain more than about 0.6 percent by weight alkali metal oxide, may then be ion exchanged and/or washed to lower the alkali metal oxide content to a desired level.

A more clear understanding of our invention may be obtained by reference to the drawing which outlines a preferred fluid catalytic cracking catalyst preparation method which may be used in the practice of our invention.

As shown in the FIGURE, sources of aluminum chlorhydrol solution, zeolite slurry and clay slurry are combined in a mixer device to obtain a uniform aqueous slurry. The mixed chlorhydrol/zeolite/clay slurry is conducted to a spray drying step wherein the slurry is converted to particulate solid composites that comprise zeolite and clay particles bound by aluminum chlorhydrol. These composites are calcined to obtain hard, attrition resistant particles. During the calcination step, the aluminum chlorhydrol is converted to a strong alumina binder. Gaseous acid chloride by-products, which are formed during the calcination are removed from the composite by a current of moving gas. The calcination step, when properly conducted, simultaneously renders the alkali metal oxide, which is present in the zeolite components, more readily available for removal by subsequent ion exchange and/or less active for subsequent deactivation of the catalyst composite.

In the embodiment shown in the drawing, the calcined catalyst composite is ion exchanged and/or washed to remove excess alkali metal oxide and any other soluble impurities which may be present. The ion exchange step may be conducted using an ammonium salt solution such as ammonium sulfate and/or rare earth chloride solution. The ion exchanged composite is preferably washed with water to remove soluble impurities. Subsequent to ion exchanging and washing, the catalyst composite, which at this point contains less than about 1 percent, preferably less than 0.5 percent, and still more preferably to less than 0.2 by weight alkali metal oxide, is dried to a level of about 5 to 25 percent by weight moisture.

The aluminum chlorhydrol solution used in the practice of the present invention is readily available from commercial sources and typically possesses the formula $Al_{2+m}(OH)_{3m}Cl_6$ wherein m has a value of about 4 to 12.

The aluminum chlorhydrol solutions are also frequently referred to in the art as polymeric cationic hydroxy aluminum complexes or aluminum chlorhydroxides which are polymers formed from a monomeric precursor having the general formula Al$_2$(OH)$_5$Cl.2-H$_2$O. For the purpose of the present application, the binder component will be referred to as aluminum chlorhydrol. The preparation of the aluminum chlorhydrol solution is typically disclosed in U.S. Pat. No. 2,196,016, Canadian Pat. No. 967,136, and in U.S. Pat. No. 4,176,090. Typically, preparation of aluminum chlorhydrol involves reacting aluminum metal and hydrochloric acid in amounts which will produce a composition having the formula indicated above. Furthermore, the aluminum chlorhydrol may be obtained using various sources of aluminum such as alumina (Al$_2$O$_3$), clay and/or mixtures of alumina and/or clay with aluminum metal. Preferably, the aqueous aluminum chlorhydrol solutions used in the practice of the present invention will have a solids content of from about 15 to 30 percent by weight Al$_2$O$_3$.

The zeolite component used in our invention is typically a synthetic faujasite zeolite such as sodium type Y zeolite (NaY) which contains from about 10 to 15 percent by weight Na$_2$O. It is also contemplated that the zeolites may be partially ion exchanged to lower the soda level thereof prior to incorporation in the catalyst. Typically, the zeolite component may comprise a partially ammonium exchanged type Y zeolite (NH$_4$NaY) which will contain in excess of 1 percent and more frequently from about 3 to 6 percent by weight Na$_2$O. Furthermore, the zeolite may be partially exchanged with polyvalent metal ions such as rare earth metal ions, calcium and magnesium. The zeolite component may also be exchanged with a combination of metal and ammonium and/or acid ions. It is also contemplated that the zeolite component may comprise a mixture of zeolites such as synthetic faujasite in combination with mordenite and the ZSM type zeolites. Preferably the zeolite is combined with the aluminum chlorhydrol and a clay component as an aqueous slurry which contains from about 20 to 60 weight percent solids.

The catalysts of the present invention may contain substantial quantities of a particulate component such as clay and/or alumina. While kaolin is the preferred clay component, it is also contemplated that thermally modified kaolin such as metakaolin may be included in the catalyst composition.

During the mixing step, as shown in the FIGURE, a spray-dryer feed slurry is obtained which contains from about 20 to 60 weight percent solids, of which from about 5 to 25 parts by weight comprises aluminum chlorhydrol (dry basis) as Al$_2$O$_3$, 1 to 60 parts by weight zeolite, and from about 0 to 90 weight percent clay. While the drawing illustrates a process by which fluid cracking catalysts are obtained by spray drying the catalyst preparation slurry, it is also contemplated that particulate catalysts of larger particle size, i.e. on the order of from about ½ to 2 mm may be obtained by forming beads or pills of the present compositions which are particularly useful for the preparation of hydroprocessing catalysts such as hydrocracking, hydrodesulfurization, hydrodenitrogenation, and demetallization catalysts.

The spray drying step is conducted using inlet temperatures in the range of from about 300° to 400° C. and outlet gas temperatures of from about 100° to 200° C. During the spray drying step, the moisture content of the particles is reduced to about 10 to 30 percent by weight. Spray dried catalysts composites have a particle size on the order of 20 to 150 microns.

After spray drying the catalyst composites are calcined at temperatures on the order of from about 300° to 700° C. for a period of from about 174 to 3 hours, and preferably about ½ to 2 hours. During the calcination step the aluminum chlorhydrol is converted to solid alumina binder and volatile acid chlorides, which are removed from the calcination zone as part of the off-gas stream. The removal of the acid chlorides at high temperatures converts the aluminum chlorhydrol to an aluminum oxide binder which produces a tough, attrition resistant catalyst particle. Furthermore, the calcination step when conducted at temperatures of about 300° to 600° C. and preferably 400° to 550° C. "activates" the residual alkali metal ions present in the zeolite component for subsequent removal by washing and/or ion exchange. The activated alkali metal ions are then readily removed by subsequent ion exchange and/or washing steps. It is noted that when the calcination temperature exceeds about 550° to 600° C., the sodium ions tend to become more difficult to remove by ion exchange. However, it is found that at higher calcination temperatures of 600° to 700° C. satisfactory catalysts may be produced without washing or ion exchange if the Na$_2$O content of the initial composite does not exceed about 0.6 percent by weight. It appears in some instances that the calcination step in some way renders the sodium ions less active for subsequent deactivation of the catalyst during use at elevated temperature.

The ion exchange step which reduces the alkali metal oxide level of the catalyst composites to less than about 1 and preferably less than 0.5, and more preferably below 0.2 percent by weight is conducted using water and/or aqueous ammonium salt solutions such as ammonium sulfate solution and/or solutions of polyvalent metals such as rare earth chloride solutions. Typically, these ion exchange solutions contain from about 1 to 10 weight percent dissolved salts. Frequently, it is found that multiple exchanges are beneficial to achieve the desired degree of alkali metal oxide removal. Typically the exchanges are conducted at temperatures on the order of from 50° to 100° C. Subsequent to ion exchanging, the catalyst components are washed, typically with water, to lower the soluble impurity level to a desirable level.

Subsequent to ion exchange and washing, the catalyst composites are dried, typically at temperatures ranging from about 100° to 200° C. to lower the moisture content thereof to a level of preferably below about 15 percent by weight.

Cracking catalysts obtained by our process are highly active for the catalytic cracking of hydrocarbons. Typically, it is found that the activity of these catalysts range from about 60 to 90 volume percent conversion subsequent to deactivation at elevated temperatures when tested in accordance with the standard activity test procedures set forth in ASTM test procedure D-3907. Furthermore, it is found that the catalysts are highly selective for the production of gasoline, and in particular, selective for the production of cracked gasoline fractions which have a high octane rating. Furthermore, the catalysts are extremely tough and attrition resistant.

While the primary components of the catalyst comprise zeolite, aluminum chlorhydrol and optionally, clay, it is also understood that other components such as particulate alumina and rare earth impregnated alumina may be added for the purpose of enhancing the SO$_x$ control capabilities of the catalyst. Furthermore, it is understood that the catalyst may be combined with minor quantities (1 to 100 ppm) of platinum and palladium which are added for the purpose of enhancing the CO oxidation characteristics of the catalyst. The attrition properties of the catalyst are expressed in terms of the Davison Index (DI) and the Jersey Index (JI) which are determined as set forth in U.S. Pat. No. 4,247,420.

Having described the basis aspects of the present invention, the following examples are given to illustrate specific embodiments thereof.

EXAMPLE 1

The following ingredients were combined in a 10 gallon stainless steel mixing kettle: 3,404 g of aluminum chlorhydrol solution possessing the formula $Al_2Cl(OH)_5$ and containing 23.5 percent by weight $Al_2O_3$; 7500 g (dry basis) kaolin; 1500 g (dry basis) calcined rare earth exchanged type Y zeolite (CREY); and sufficient water to obtain a slurry which contained 25 weight percent solids. The calcined, rare earth exchanged type Y zeolite was obtained by exchange with aqueous mixed rare earth chloride solution at pH=5 of NaY followed by calcination for 3 hours at 1000° F. and contained 15.02 weight percent $RE_2O_3$ and 3.8 weight percent $Na_2O$. The slurry was thoroughly agitated and spray dried using a gas inlet temperature of 320° C. and a gas outlet temperature of 150° C. The spray dried catalyst particles which contained about 25 weight percent water and 0.5 weight percent $Na_2O$ were calcined (i.e. heated) in a muffle furnace at a temperature of 1000° F. for 1 hours. Subsequent to calcination the catalyst was dried at a temperature of 150° C. The chemical analysis of this catalyst as well as its cracking properties are set forth in Table I.

EXAMPLE 2

The preparation method of Example 1 was repeated. However, 3000 g of the calcined catalyst particles were ion exchanged by contact with 9000 ml of ammonium sulfate solution which contained 3 weight percent by weight ammonium sulfate. The analysis and properties of this catalyst are set forth in Table I.

EXAMPLE 3

The preparation method of Example 1 was repeated. However, the zeolite comprised an ammonium rare earth exchanged, calcined type Y zeolite which contained 12.5 weight percent $RE_2O_3$, and 0.5 weight percent $Na_2O$. The catalyst was not ion exchanged subsequent to calcination. The properties of this catalyst sample are set forth in Table I.

EXAMPLE 4

The preparation procedure of Example 1 was repeated. However, a non-calcined rare earth exchanged Y zeolite was utilized (REY) which contained 13.4 weight percent $Re_2O_3$ and 3.2 weight percent $Na_2O$. This catalyst sample was not ion exchanged subsequent to calcination. The properties of this catalyst are set forth in Table I.

EXAMPLE 5

The catalyst preparation method of Example 4 was repeated. However, 3000 g of the calcined catalyst was exchanged with 9000 ml of ammonium sulfate solution containing 3 weight percent by weight ammonium sulfate subsequent to calcination. The properties of this catalyst are set forth in Table I.

EXAMPLE 6

The catalyst preparation method of Example 1 was repeated. However, the finished catalyst contained 25 weight percent of a sodium ammonium Y zeolite which contained 3.8 weight percent $Na_2O$ which was obtained by exchanging a sodium Y zeolite with ammonium sulfate. 3000 g of this catalyst was washed with 9000 ml of water subsequent to calcination. The properties of this catalyst are set forth in Table II.

EXAMPLE 7

The catalyst preparation procedure of Example 6 was repeated. However, subsequent to calcination 3000 g of the catalyst was exchanged with 9000 ml of ammonium sulfate solution which contained 3 weight percent by weight ammonium sulfate. The properties of these catalysts are described in Table II.

EXAMPLE 8

The catalyst preparation method of Example 1 was repeated. However, the zeolite comprised 25 weight percent of an ammonium exchanged, calcined, stabilized Type Y zeolite (Z14US zeolite) which was prepared in accordance with the process set forth in U.S. Pat. No. 3,449,070. The Z14US zeolite, at the time of incorporation in the catalyst, contained about 3.8 weight percent $Na_2O$. 3000 g of the catalyst subsequent to calcination was exchanged with 9000 ml of ammonium sulfate solution. The properties of this catalyst are set forth in Table II.

EXAMPLE 9

The catalyst preparation method of Example 1 was followed. However, a catalyst was prepared which contained 40 weight percent ammonium exchanged type Y zeolite which contained 3.8 weight percent $Na_2O$. Furthermore, the quantity of chlorhydrol was adjusted to provide an alumina binder content of 15 weight percent and the kaolin content was adjusted to 45 weight percent. This catalyst was not washed subsequent to calcination. The properties of the catalyst are set forth in Table III.

EXAMPLE 10

The catalyst preparation method of Example 9 was repeated. However, subsequent to calcination 3000 g of the catalyst was washed with 9000 ml of water. The properties of this catalyst are set forth in Table III.

EXAMPLE 11

The catalyst preparation method of Example 9 was repeated. However, subsequent to calcination 3000 g of the catalyst was washed with 9000 ml of ammonium sulfate solution which contained 3 weight percent of ammonium sulfate. The properties of this catalyst are set forth in Tables III and IV.

EXAMPLE 12

A commercial comparison catalyst which contained 40 weight percent Z14US zeolite, 23 weight percent of a silica sol binder, and 37 weight percent kaolin clay was prepared by the method set forth in U.S. Pat. No. 3,957,689. This catalyst was washed with ammonium sulfate and the properties thereof are described in Table IV.

EXAMPLE 13

A catalyst was prepared by the method set forth in Example 9. However, the zeolite component comprised 40 weight percent of a Z14US type zeolite which had been exchanged with ammonium sulfate to a level of about 0.2 percent by weight $Na_2O$. This catalyst was not ion exchanged or washed subsequent to calcination. The properties of this catalyst are set forth in Table IV.

EXAMPLE 14

In this example the properties of the catalysts prepared in Examples 1 through 5 were determined and tabulated in Table I below:

TABLE I

| Catalyst of Example No. | 1 | 2 | 3 | 4 | 5 |
|---|---|---|---|---|---|
| Analyses | | | | | |
| Wt. % $Na_2O$ | 0.51 | 0.14 | 0.18 | 0.44 | 0.18 |
| Wt. % $RE_2O_3$ | 2.26 | 2.33 | 2.43 | 2.77 | 2.74 |
| Wt. % $SO_4$ | 0.18 | 1.31 | 0.15 | 0.13 | 0.67 |
| Surface Area $m^2/g$ | 133 | 133 | 148 | 148 | 146 |
| Density $g/cm^2$ | 0.84 | 0.84 | 0.84 | 0.87 | 0.87 |
| Davison Index/ Jersey Index | 6/0.8 | 36/3.5 | 3/0.1 | 3/0.9 | 16/1.7 |
| Microactivity (Vol. % Conv.) Deactivation (S-13.5)* | 72 | 73 | 71 | 76 | 76 |
| Deactivation (1500)** | 54 | 68 | 65 | 62 | 72 |
| Wash/ Exchange | None | $(NH_4)_2SO_4$ | None | None | $(NH_4)_2SO_4$ |

*S-13.5: 3 hours at 1000° F. in air followed by 8 hours at 1350° F. in 100% steam at 15 psig.
**1500: 5 hours at 1500° F. in 100% steam at 0 psig.

It is noted from the data set forth in Table I that the activity of catalysts which contained the non-calcined Y zeolite (Examples 4 and 5) are superior to those which contained the precalcined zeolite (Examples 1, 2 and 3). Furthermore, it is noted that the catalysts of Examples 1 and 4 which are not exchanged after calcination and which contain relatively high levels of $Na_2O$, possess a relatively high level of stability and activity.

EXAMPLE 15

In this example the properties of the catalysts prepared in Examples 6, 7 and 8 were determined and are compared in Table II below.

TABLE II

| Catalyst of Example No. | 6 | 7 | 8 |
|---|---|---|---|
| Wt. % $Na_2O$ | 0.58 | 0.13 | 0.27 |
| Unit Cell (Å) | 24.62 | 24.62 | 24.62 |
| Microactivity (Vol. % Conversion after S-13.5 deactivation) | 60 | 59 | 57 |
| Pilot Unit Data | | | |
| Microactivity (Vol. % Conversion) after S-20 deactivation* | 58.5 | 62.0 | 60.5 |
| Research Octane No. | 89.5 | 90.3 | 90.6 |
| Motor Octane No. | 78.2 | 79.0 | 79.3 |
| Wash/Exchange | $H_2O$ wash | $(NH_4)_2SO_4$ | $(NH_4)_2SO_4$ |

*S-20: 18 hours at 1520° F., 20% steam, 80% air, 0 psig.

It is noted from the data set forth in Table II that the octane selectivity for the catalysts prepared in accordance with the teachings of the present invention (Examples 6 and 7) are almost equal to the catalyst which contained the precalcined Z14US type Y zeolite (Example 8). Furthermore, it is noted that the catalyst of Example 6, which was not exchanged with ammonium sulfate solution and which contains a high level of $Na_2O$, possesses a reasonably high level of activity and octane selectivity.

EXAMPLE 16

In this example the properties of the catalysts obtained in Examples 9, 10 and 11 are compared, as set forth in Table III below.

TABLE III

| Catalyst Example No. | 9 | 10 | 11 |
|---|---|---|---|
| Wash/Exchange | No wash/ exchange | Water wash | Ammonium sulfate exchange |
| Wt. % $Na_2O$ | 2.11 | 0.91 | 0.54 |
| Microactivity after S-13.5 deactivation | 16 | 50 | 67 |

The above data indicates that substantial soda removal may be obtained through use of the practice of the present invention, even though only water (Example 10) is used in lieu of ammonium sulfate solution (Example 11). Furthermore, it is noted that the catalysts of Examples 10 and 11 which have $Na_2O$ levels of above 0.5 weight percent still possess a fairly high level of activity.

EXAMPLE 17

The properties of the catalysts described in Examples 11, 12 and 13 are compared and summarized in Table IV below.

TABLE IV

| Catalyst Example No. | 11 | 12 | 13 |
|---|---|---|---|
| Wt. % $Na_2O$ | 0.22 | 0.54 | 0.04 |
| Microactivity after S-13.5 deactivation | 69 | 67 | 69 |
| Activity (Vol. % conversion) after 1400 deactivation* | 55.0 | 68.0 | 71.0 |
| Research Octane No. | 92.8 | 92.7 | 93.0 |
| Motor Octane No. | 81.3 | 80.2 | 81.8 |
| Wash/Exchange | $(NH_4)_2SO_4$ | $(NH_4)_2SO_4$ | None |

*1400: 16 hours at 1000° F. in air followed by 16 hours at 1400° F., 100% steam, 0 psig.

The above data indicate that use of the process described in the present invention (Examples 11 and 13) provides catalysts of high activity and good octane selectivity when compared to a prior art catalyst (Example 12).

EXAMPLE 18

A spray dried catalyst composite was prepared which contained 16 weight percent rare earth exchanged type Y zeolite (3.2 wt. % Na$_2$O), 10 weight percent alumina (as chlorhydrol binder) and 74 weight percent kaolin clay. Three samples of the catalyst composites were calcined at 800°, 1000° and 1200° F. for two hours, respectively. The calcined catalyst samples were exchanged with dilute ammonium sulfate solution. The properties of the samples are set forth in Table V.

TABLE V

| Sample No. | 1 | 2 | 3 |
|---|---|---|---|
| Calcination temperature (°F./°C.) | 800/427 | 1000/538 | 1200/649 |
| Na$_2$O (wt. %) | 0.07 | 0.19 | 0.38 |
| DI/JI | 16/1.1 | 2/0.9 | 8/0.8 |
| RE$_2$O$_3$ (wt. %) | 3.66 | 3.92 | 3.89 |

The above data indicate that as the calcination temperature increases from 800° to 1000° to 1200° F. the amount of Na$_2$O removed by ion exchange progressively decreases.

We claim:

1. In a process for preparing catalyst compositions wherein (a) a zeolite is mixed with an aluminum chlorhydrol binder, (b) the mixture is formed into particles, and (c) the particles are calcined to obtain hard, attrition resistant catalysts, the improvement comprising;
combining a zeolite which contains in excess of about one percent by weight alkali metal oxide with the chlorhydrol, calcining the particles at a temperature of about 300° to 600° C., and ion exchanging and washing the formed calcined particles to obtain a catalyst containing less than about one percent by weight alkali metal oxide.

2. The method of claim 1 wherein said catalyst particles have an alkali metal oxide content of below about 0.5 weight percent.

3. The method of claim 1 wherein said aluminum chlorhydrol has the formula Al$_{2+m}$(OH)$_{3m}$Cl$_6$ wherein m has a value of about 4 to 12.

4. The method of claim 1 wherein the zeolite is a type Y zeolite which contains about 3 to 6 percent by weight Na$_2$O.

5. The method of claim 1 wherein said aqueous mixture prepared in step (a) includes clay.

6. The method of claim 1 wherein said mixture is formed at step (b) by spray drying.

7. The method of claim 1 wherein said ion exchange step includes contacting the calcined particles with a solution which includes ammonium ions and/or rare earth ions.

8. The method of claim 1 wherein said particles are calcined at a temperature of 500° to 550° C. and is ion exchanged and/or washed to lower the alkali metal oxide content thereof to below about 0.5 percent by weight.

9. The method of claim 8 wherein said alkali metal oxide content is lowered to below about 0.2 percent by weight.

10. A catalyst composition prepared by the method of claim 1.

11. A fluid cracking catalyst composition prepared by the method of claim 6.

12. The composition of claim 10 wherein said catalyst contains from about 1 to 60 parts by weight zeolite, 5 to 25 parts by weight alumina binder, and up to about 90 parts by weight of a particulate component selected from the group consisting of alumina, rare-earth impregnated alumina, clay and mixtures thereof.

13. The catalyst composition of claim 12 wherein said zeolite is type Y zeolite.

14. The catalyst composition of claim 13 wherein said zeolite is exchanged with rare earth and/or ammonium ions.

15. A hydroprocessing catalyst support prepared in accordance with the method set forth in claim 1.

16. In a method for preparing catalyst compositions wherein (a) a zeolite is mixed with an aluminum chlorhydrol binder, (b) the mixture is formed into particles, and (c) the particles are calcined to obtain hard, attrition resistant catalysts, the improvement consisting essentially of;
mixing a zeolite containing about 3 to 6 percent by weight alkali metal oxide in amounts to provide active catalysts which contain less than about 0.6 percent by weight alkali metal oxide.

17. The method of claim 16 wherein said particles are calcined at a temperature of 500° to 700° C.

18. The method of claim 17 wherein said particles contain below about 0.5 percent by weight alkali metal oxide.

19. The method of claim 16 wherein said aluminum chlorhydrol has the formula Al$_{2+m}$(OH)$_{3m}$Cl$_6$ wherein m has a value of about 4 to 12.

20. The method of claim 16 wherein the zeolite is a type Y zeolite.

21. The method of claim 16 wherein the mixture prepared in step (a) includes clay.

22. The method of claim 16 wherein said ion exchange step (d) includes contacting the calcined particles with a solution which includes ammonium ions and/or rare earth ions.

23. A catalyst composition prepared by the method of claim 16.

24. A fluid cracking catalyst composition prepared by the method of claim 22.

25. The composition of claim 25 wherein said catalyst contains from about 1 to 60 parts by weight zeolite, 5 to 25 parts by weight alumina binder, and up to about 90 parts by weight of a particulate component selected from the group consisting of alumina, rare-earth impregnated alumina, clay and mixtures thereof.

26. The catalyst composition of claim 26 wherein said zeolite is type Y zeolite.

27. The catalyst composition of claim 27 wherein said zeolite is exchanged with rare earth and/or ammonium ions.

28. A hydroprocessing catalyst support prepared in accordance with the method set forth in claim 16.

* * * * *